United States Patent
Schneider et al.

(10) Patent No.: US 6,908,224 B2
(45) Date of Patent: Jun. 21, 2005

(54) TEMPERATURE SENSOR PRE-CALIBRATION METHOD AND APPARATUS

(75) Inventors: Harvey Schneider, Southbury, CT (US); David M. Carson, Newtown, CT (US); Ellen Deutsch, Wallingford, CT (US)

(73) Assignee: Kendro Laboratory Products, LP, Newtown, CT (US)

( * ) Notice: Subject to any disclaimer, the term of this patent is extended or adjusted under 35 U.S.C. 154(b) by 0 days.

(21) Appl. No.: 10/442,092

(22) Filed: May 21, 2003

(65) Prior Publication Data

US 2004/0052290 A1 Mar. 18, 2004

(Under 37 CFR 1.47)

Related U.S. Application Data

(60) Provisional application No. 60/381,812, filed on May 21, 2002.

(51) Int. Cl.$^7$ .................. G01K 15/00; G01K 19/00; G01K 7/21
(52) U.S. Cl. ................ 374/1; 374/3; 374/171; 374/172
(58) Field of Search ............... 374/1, 208, 171, 374/172, 129, 3; 702/99, 133

(56) References Cited

U.S. PATENT DOCUMENTS

| | | | | | |
|---|---|---|---|---|---|
| 3,348,408 | A | * | 10/1967 | Engborg | 374/2 |
| 4,481,596 | A | * | 11/1984 | Townzen | 702/99 |
| 5,080,106 | A | * | 1/1992 | Sekii et al. | 600/505 |
| 5,144,814 | A | * | 9/1992 | Gaudette | 62/225 |
| 5,767,792 | A | * | 6/1998 | Urbas et al. | 340/870.17 |
| 5,829,876 | A | * | 11/1998 | Schwartz et al. | 374/1 |
| 5,857,777 | A | * | 1/1999 | Schuh | 374/172 |
| 6,003,307 | A | * | 12/1999 | Naber et al. | 60/274 |
| 6,045,260 | A | * | 4/2000 | Schwartz et al. | 374/183 |
| 6,059,452 | A | * | 5/2000 | Smith et al. | 374/169 |
| 6,193,411 | B1 | * | 2/2001 | Chen | 374/2 |
| 6,283,628 | B1 | * | 9/2001 | Goodwin | 374/1 |
| 6,283,629 | B1 | * | 9/2001 | Kraus et al. | 374/2 |
| 6,446,019 | B1 | * | 9/2002 | Kynett et al. | 702/104 |
| 6,499,677 | B2 | * | 12/2002 | Dallmeyer et al. | 239/575 |
| 6,609,076 | B2 | * | 8/2003 | Schuh et al. | 702/99 |
| 6,674,185 | B2 | * | 1/2004 | Mizuta | 307/651 |
| 6,709,152 | B1 | * | 3/2004 | Bronlund | 374/3 |

* cited by examiner

*Primary Examiner*—Gail Verbitsky
(74) *Attorney, Agent, or Firm*—Baker & Hostetler LLP; Sean A. Pryor

(57) ABSTRACT

A centrifuge temperature pre-calibration apparatus including a memory storage device having correction coefficients for temperature, a controller, an un-calibrated temperature sensor and a calibrated temperature display device connected to a computer which based on data from these connections calculates a slope of a line and calculates actual temperature based on this slope and an offset value. The slope is determined by the ratio of the difference between a second data point and a first data point of the calibrated temperature display device and the difference between the second data point and the first data point of the un-calibrated temperature sensor.

9 Claims, 3 Drawing Sheets

TEMPERATURE SENSOR PRE-CALIBRATION METHOD AND APPARATUS

PRIORITY

This application claims priority to the provisional U.S. patent application entitled TEMPERATURE SENSOR PRE-CALIBRATION, filed May 21, 2002, having a Ser. No. 60/381,812, the disclosure of which is hereby incorporated by reference.

FIELD OF THE INVENTION

The present invention relates generally to temperature sensor calibration. More particularly, the present invention relates to centrifuge temperature pre-calibration.

BACKGROUND OF THE INVENTION

In centrifuging apparatus, constituents/components of a given material (e.g., liquid solutions/mixtures) can be separated based upon the variation of their respective densities and the centrifugal forces to which such constituents/components are subjected. Generally, the material is positioned within a centrifuge bowl or rotor which is rotated at a speed such that the various constituents will effectively assume a radial position within the rotor based upon their respective densities (i.e., constituents having higher densities will be closer to the outer rim of the centrifuge rotor than those having lower densities). The particles of the highest density are collected at the outside edge of the rotor. During rotation of the centrifuge rotor, which is often at relatively high angular velocities in order to generate the magnitude of centrifugal forces needed for separation, the temperature of the rotor and the materials contained therein may undesirably change due to the heating affect of air friction. For instance, certain materials and/or constituents may experience undesired degradation at higher ambient temperature. Moreover, certain temperatures may have an undesirable/adverse effect on certain biological samples during centrifuging, or may actually cause an undesirable reaction amongst certain of the constituents. In addition, certain temperatures may impede the separation of certain constituents from the remainder of the material by centrifuging.

Based upon the foregoing, a number of alternatives have been explored for reading and/or maintaining a temperature of a centrifuge and thus the material within the centrifuge rotor. For instance, it is known to enclose the entire centrifuge within a temperature-controlled housing. More particularly, the air within the housing is maintained at the desired temperature so as to maintain the centrifuged material at such temperature by convection. In these types of configurations, given the heat transfer inefficiencies of convection utilizing air as the heat transfer medium, it is important to maintain a tight seal for the housing in order to maintain temperature control. Consequently, any opening of the housing to remove and/or add materials to the centrifuge will thus affect the housing temperature, and upon any subsequent closing of the housing a certain period of time will be required before the desired steady-state temperature is once again reached.

In contrast to attempting to maintain the temperature of the entire centrifuge by utilizing the above-described types of temperature-controlled housings, other apparatus have attempted to directly cool or heat only the periphery of the centrifuge chamber that contains the centrifuge rotor.

Temperature control systems have also been incorporated on other types of rotating apparatus. For instance, certain analyzers are available in which a plurality of cuvettes are positioned on an outer portion of a rotor. These cuvettes typically have a relatively small volume for receiving at least two different constituents which are initially maintained in separate but interconnected cavities in the rotor. As a result of the centrifugal forces created by rotation of the rotor at a certain speed, the constituents from the separate cavities enter a radially aligned cuvette. The reaction of the two constituents in each cuvette is then monitored and/or analyzed. Since the reaction of the constituents is often temperature-sensitive, heating devices are often employed so as to maintain the peripherally-positioned cuvettes and their constituents at a certain temperature.

Various temperature control alternatives have been explored for cuvette rotors which are generally of the above-described type. For instance, hot air has been used to control either the temperature of an entire housing in which the cuvette rotor is positioned, or at least the space between the periphery of the rotor, which again contains the cuvettes, and the rotor housing. Other apparatus have incorporated heating elements directly on the periphery of the rotor substantially adjacent to the cuvettes to provide for a conductive heat.

However, the above-noted temperature control techniques are only as good as the calibration of the temperature sensor used in reading the data. Thus, there remains a need for a temperature control system which may be readily adapted for use with centrifuges of a variety of configurations, and which effectively records the temperature of substantially the entire centrifuge bowl and materials contained therein without significantly impacting the structure of an existing centrifuge and/or without requiring extensive modifications/additions to the centrifuge and its surroundings and/or requiring extensive field adjustments.

Centrifuges currently employed in laboratories are generally operated by manual controls using various settings and procedures. A rotor control may be used to set the centrifuge to a specific sized or type of rotor. A temperature control and timer are also frequently used depending on the type of sample being tested. There are conventional power switches to manually turn the units on or off as needed. A physical key lock is commonly used to secure centrifuge access from operation. Screwdriver adjusted sensors or trimmers are traditionally used to correct the setting of the temperature sensor. This adjustment is exceedingly time consuming, inaccurate, and prone to drifting. It is also inconvenient to perform the calibration in this manner at customer installation or in the field.

The present invention overcomes the prior art problems by utilizing a digital memory having correction coefficients resulting in the temperature sensors being pre-calibrated.

SUMMARY OF THE INVENTION

The foregoing needs are met, to a great extent, by the present invention, wherein in one aspect an apparatus is provided that in some embodiments utilizing a temperature sensor pre-calibration method and apparatus.

In accordance with one aspect of the present invention, a sensor device is provided comprising a memory storage device and a controller connected to the memory storage device, wherein the memory storage device includes correction coefficients which calibrate the sensor to report the correct temperature.

In accordance with another aspect of the present invention, a method of calibrating a temperature display device is provided comprising the steps of placing an un-calibrated temperature sensor into a controlled environment, placing a calibrated temperature display device into said controlled environment, bringing the controlled environment to a first predetermined temperature, reading a first data point of the un-calibrated temperature sensor, reading a first data point of the calibrated temperature display/reading device, and comparing the first data point of the un-calibrated temperature sensor to the first data point of the calibrated temperature display device to obtain a temperature sensor offset value. The controlled environment is then brought to a substantially higher temperature and second data point is recorded for the calibrated temperature display/reading device and the un-calibrated sensor. From these two data points, if the sensor has a known linear response, a response curve and offset for the sensor may be derived. It should be noted that additional points may be required if the sensor has a non-linear response curve.

In accordance with yet another aspect of the present invention, a pre-calibrated temperature display/reading device is provided comprising means for placing an un-calibrated temperature sensor in a controlled environment, means for placing a calibrated temperature display device into the controlled environment, means for bringing the controlled environment to a first predetermined temperature, means for reading a first data point of the un-calibrated temperature sensor, means for reading first data point of the calibrated temperature display device, and means for comparing the first data point of the un-calibrated temperature sensor to the first data point of the calibrated temperature display device to obtain a temperature sensor offset value. The controlled environment is then brought to a substantially higher temperature and second data point is recorded for the calibrated temperature display/reading device and the un-calibrated sensor. From these two data points, if the sensor has a known linear response, a response curve and offset for the sensor may be derived. Again, it should be noted that additional points may be required if the sensor has a non-linear response curve.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DESCRIPTION OF THE INVENTION

Figure 1:
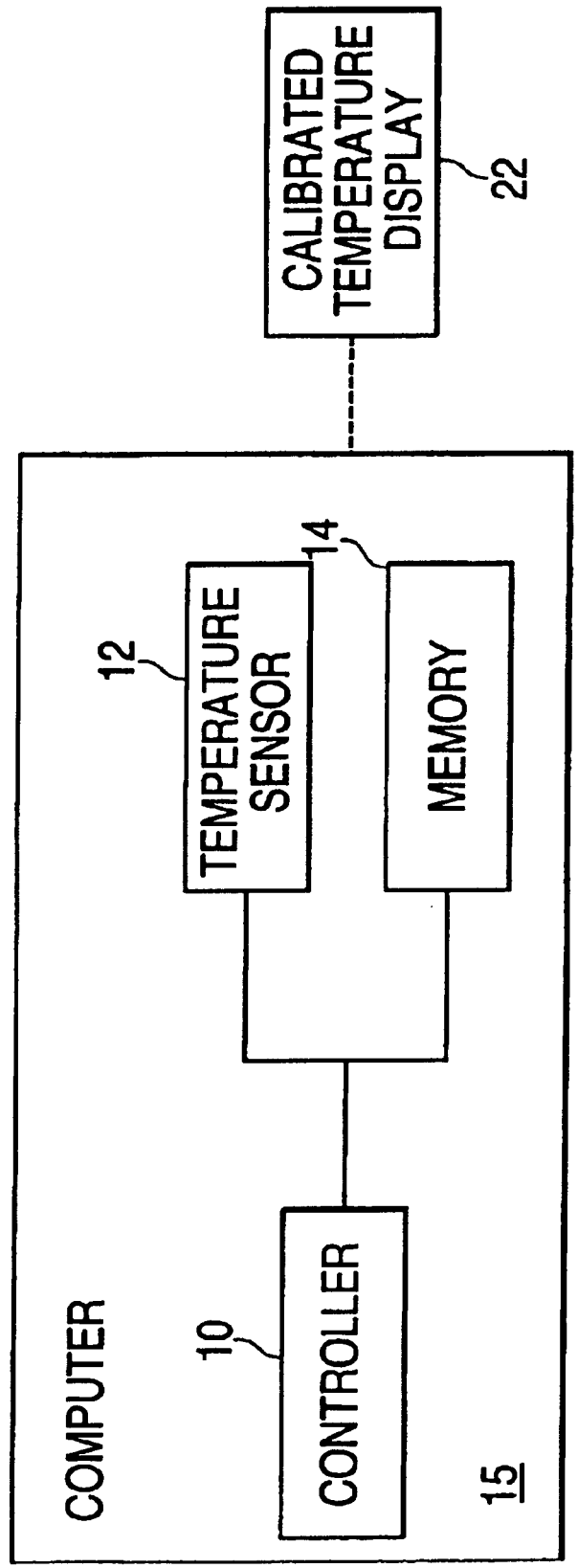
FIG. 1 is a block diagram of one preferred embodiment of the present invention showing the centrifuge temperature sensor, controller and memory.

The invention will now be described with reference to the drawing figures, in which like reference numerals refer to like parts throughout.

Referring to FIG. 1, a preferred embodiment of the invention provides a temperature sensor 12 having a memory 14 which may be of a digital memory configuration connected to a centrifuge controller 10. The controller 10 is configured to maintain the digital memory 14 and temperature sensor 12 data and readings, respectively.

Figure 2:
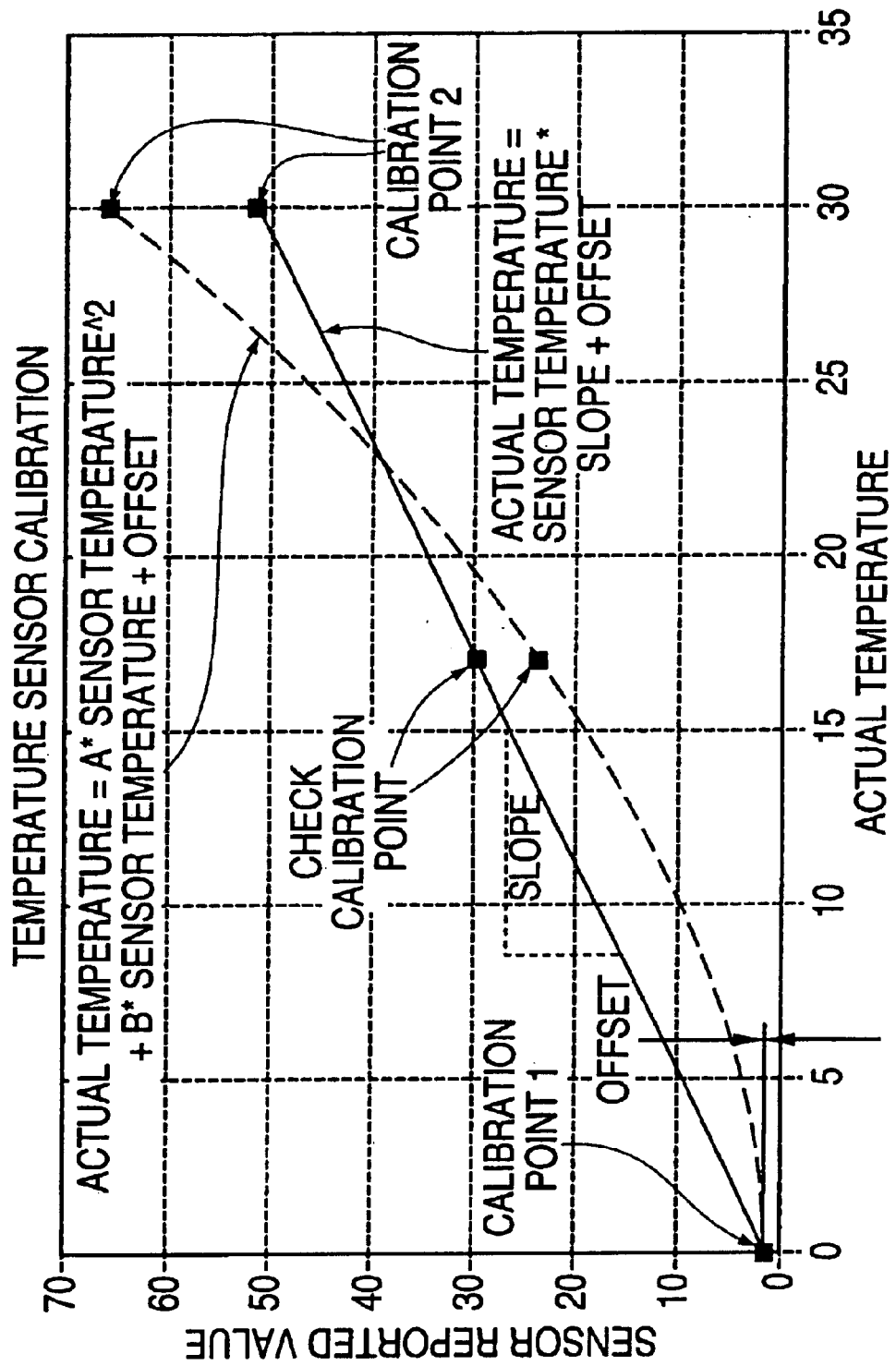
FIG. 2 is a graphic showing actual temperature vs. sensor value of one preferred embodiment of the present invention.

Referring to FIG. 2, the response curve of the temperature sensor 12 is first determined either from manufacture's data or by experimentation. The response may be linear as shown in FIG. 2, or in the form of quadratic equation, $C1*X^2 + C2*X + Offset$ or any other type of known response, where C1 and C2 are the constants of the equation derived from the data shown in FIG. 2.

Figure 3:
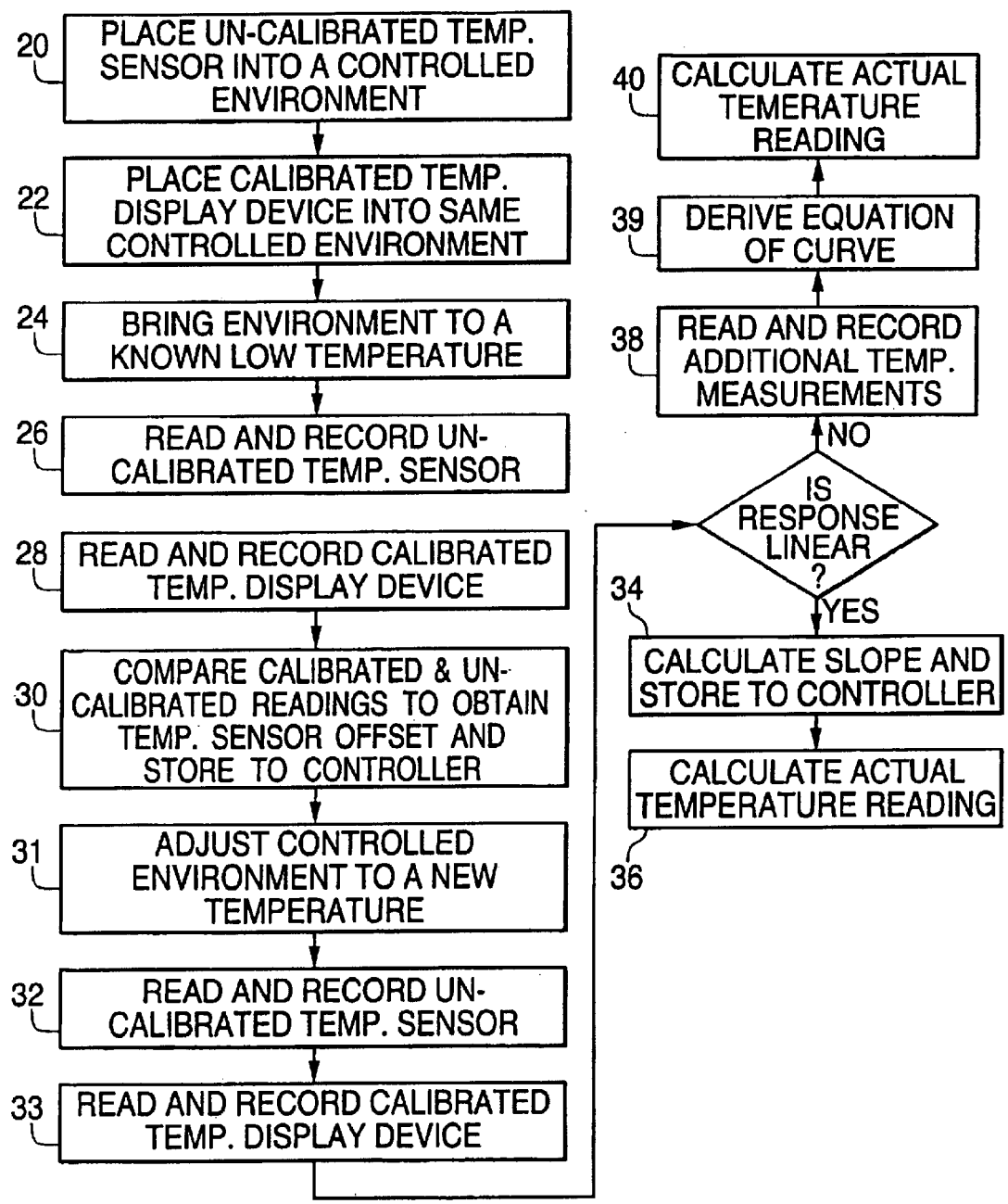
FIG. 3 shows a flowchart of the method of one preferred embodiment of the present invention.

Referring to FIG. 3, in operation the temperature sensor 12 is pre-calibrated in the following manner. The un-calibrated temperature sensor 12 is placed in a carefully controlled temperature environment 20. This controlled temperature environment may be a calibrated temperature bath, an air environment or any environment in which the temperature and be controlled and adjusted. Also placed in the environment is a calibrated thermometer or other type of calibrated temperature display device 22. The controlled environment is brought to a low temperature, for example 0° C. The reading and recording 26 of the temperature sensor 12, Sensor 1, and the reading and recording 28 of the calibrated thermometer or other type of calibrated temperature display device, Calibrate 1, may be recorded manually or in a computer memory. The difference between the reading 26 of the temperature sensor, Sensor 1, and the reading 28 of the calibrated temperature device, Calibrate 1, is the temperature sensor offset 30. This offset 30 is recorded manually or in a computer memory. The controlled environment temperature is then adjusted to a different temperate 31, for example 30° C. The reading and recording 32 of the temperature sensor 12 at this second point, Sensor 2, and the reading and recording 33 of the calibrated thermometer, Calibrate 2, are recorded manually or in a computer memory. For example, in the case of a temperature sensor 12 with a known linear response the slope of the response curve can now be determined. The slope of the curve 34 is the determined by the following equation:

Slope=(Calibrate 2−Calibrate 1)/(Sensor 2−Sensor 1)

The slope equation may be determined manually or with the aid of a computer program. This slope may be recorded manually or in a computer memory.

Also a third measurement point can be taken at a temperature between the two calibration points as a check on the accuracy of the determination of the offset and slope. At this point the offset and slope are stored in the memory 14 for access by the centrifuge controller 10.

At this point the actual temperature 36 can be obtained from the tested temperature sensor by the following equation:

Actual_Temperature=Sensor_Temperature*Slope+Offset

In the case of a temperature sensor with a non-linear response 38 a third measurement point, or as many as required, can be taken to accurately derive the equation of the curve 39 either manually or by using readily available computer software. Now the actual temperature 40 may be calculated.

At this point the centrifuge controller 10 can determine the actual temperature from the tested temperature sensor 12 by the following equation:

$$Actual\_Temperature = C1*Sensor\_Temp.^2 + C2*Sensor\_Temp. + Offset$$

where, C1 and C2 are the constants of the equation derived from the testing described above either manually or by computer by a number of known methods stored in the memory 14.

In another embodiment of the invention, when the response of the temperature sensor 12 is not known, a number of calibration points can be taken. The response curve and the offset are then derived manually or by computer 15 by a number of known mathematical/numerical methods.

Referring back to FIG. 1, the memory 14 is combined with the temperature sensor 12. This memory 14 may be on the same printed circuit board (not shown) as the temperature sensor 12 or in a remote location. The coefficients for correction of the temperature sensor readings are stored in the memory 14 at the time of manufacture or assembly of the temperature sensor 12. Thus, the pre-calibrated temperature sensor 12 of the present invention that is installed in systems both at a production facility arena and as service parts in the field do not require calibration. The controller 10 will use the temperature sensor offset and the temperature sensor response slope or curve to determine the actual temperature from any sensor reading.

The many features and advantages of the invention are apparent from the detailed specification, and thus, it is intended by the appended claims to cover all such features and advantages of the invention which fall within the true spirits and cope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of calibrating a temperature display device, comprising the steps of:
    placing un-calibrated temperature sensor into a controlled environment;
    placing calibrated temperature display device into said controlled environment;
    bringing said controlled environment to a first predetermined temperature;
    reading first data point of said un-calibrated temperature sensor;
    reading first data point of said calibrated temperature display device;
    comparing said first data point of the un-calibrated temperature sensor to said first data point of the calibrated temperature display device to obtain a temperature sensor offset value;
    adjusting the controlled environment to a second predetermined temperature;
    reading second data point of said un-calibrated temperature sensor;
    reading second data point of said calibrated temperature display device; and
    determining actual temperature reading, wherein the determining step further comprises calculating a slope of a line and calculating actual temperature based on said slope and said offset value and herein the slope is determined by the ratio of the difference between the second data point and the first data point of the calibrated temperature display device and the difference between the second data point and the first data point of the un-calibrated temperature sensor.

2. The method of claim 1, wherein said first and second data points of the un-calibrated sensor are stored in a memory device.

3. The method of claim 2, wherein said first and second data points of the calibrated temperature display device are stored in the memory device.

4. The method of claim 3, wherein said memory device is digital.

5. The method of claim 1, wherein the determining step further comprises:
    reading additional data point temperature measurements,
    deriving an equation of a curve, and
    calculating the actual temperature.

6. The method of claim 1, wherein said first predetermined temperature is substantially 0° C.

7. A pre-calibrated temperature display device, comprising:
    means for bringing said controlled environment to a first predetermined temperature;
    means for reading a first data point of said un-calibrated temperature sensor;
    means for reading first data point of said calibrated temperature display device;
    means for comparing said first data point of the un-calibrated temperature sensor to said first data point o the calibrated temperature display device to obtain a temperature sensor offset value;
    means for adjusting the controlled environment to a second predetermined temperature;
    means for reading a second data point of said un-calibrated temperature sensor;
    means for reading a second data point of said calibrated temperature display device; and
    means for determining actual temperature reading, wherein the means for determining actual temperature reading further comprises means for calculating a slope of a line and means for calculating actual temperature based on said slope and said offset value and wherein the slope is determined by the ratio of the difference between the second data point and the first data point of the calibrate temperature display device and the difference between the second data point and the first data point of the un-calibrated temperature sensor.

8. The device of claim 7, wherein said first predetermined temperature is substantially 0° C.

9. The device of claim 7, wherein the means for determining actual temperature reading comprises:
    means for reading additional data point temperature measurements,
    means for deriving an equation of a curve, and
    means for calculating the actual temperature.

* * * * *

UNITED STATES PATENT AND TRADEMARK OFFICE
CERTIFICATE OF CORRECTION

PATENT NO. : 6,908,224 B2
DATED : June 21, 2005
INVENTOR(S) : Harvey Schneider et al.

It is certified that error appears in the above-identified patent and that said Letters Patent is hereby corrected as shown below:

Column 5,
Lines 54 and 56, please replace "reading first" with -- reading a first --;
Line 65, please replace "reading second" with -- reading a second --;

Column 6,
Line 1, please replace "reading second" with -- reading a second --;
Line 6, please replace "herein" with -- wherein --;
Line 38, please replace "o the calibrated temperature" with -- of the calibrated temperature --;
Line 54, please replace "the calibrate" with -- the calibrated --.

Signed and Sealed this

Eighteenth Day of October, 2005

JON W. DUDAS
*Director of the United States Patent and Trademark Office*